May 24, 1927.  H. J. POOLE  1,630,215
MEANS FOR SEALING RECEPTACLES
Filed Feb. 14, 1921

Inventor
Henry J. Poole
By
Attorney

Patented May 24, 1927.

1,630,215

UNITED STATES PATENT OFFICE.

HENRY JEFFREY POOLE, OF LONDON, ENGLAND.

MEANS FOR SEALING RECEPTACLES.

Application filed February 14, 1921, Serial No. 444,815, and in Great Britain April 29, 1920.

This invention relates to the evacuation of tins or other wholly or partly metallic airtight vessels and in particular to the method of sealing the tins or the like when the evacuation has been effected.

According to the present invention, after the evacuation of the air or other gases or vapors from the vessel, which is effected in the known manner through a minute pinhole in one of the walls of the otherwise hermetically sealed vessel, a small disc or very thin paper or equivalent material, preferably in itself of an impervious character, which during evacuation is held in position ready for sealing by the suction of the exhausting device, is automatically applied to the pinhole so as to close the same, the permanent sealing of the disc over the hole being effected by means of a suitable adhesive or cement such as shellac varnish, which may be brushed over the disc or may have been previously applied around the pinhole.

The apparatus involved comprises a specially formed suction nozzle which is shown in the drawings, in which.

The device as shown is connected with an evacuating device such as, for example, any suitable kind of mechanical pump and vacuum chamber, not shown, this nozzle $a$ having a luting ring $b$ preferably of india rubber, which is pressed against the wall $c$ of the tin so as to include the pinhole $d$, and a spring-urged plunger $e$ centrally arranged, the function of which is to press the paper washer $f$ upon the surface of the vessel over the hole $d$ so as to seal the latter automatically when the pump is cut off or the vacuum is broken.

The plunger $e$ has a central aperture $g$ extending axially through it and a collar $e'$ which is seated under the action of the spring $i$ on an internal shoulder $a'$ of the nozzle $a$ so as to close the nozzle aperture $a°$. When the nozzle is applied by hand to the tin with a sealing disc $f$ in position over the pinhole and the luting ring $b$ pressed down into close contact with the tin and the connection with the exhausting device established, the consequent reduction of pressure in rear of the collar valve $e'$ causes the plunger $e$ to be withdrawn against the force of the spring $i$ and with it the sealing disc $f$, which is held by suction against the face of the plunger, the pinhole $d$ being consequently uncovered to permit evacuation of the tin. When the evacuation of the tin is completed the vacuum within the nozzle is broken, whereupon the sealing disc is instantly pressed over the pinhole by the spring-urged plunger $e$ and seals the hole. After the removal of the nozzle the washer may be painted over with shellac varnish or equivalent adhesive or cement, although this precaution is not absolutely necessary.

Figure 1:
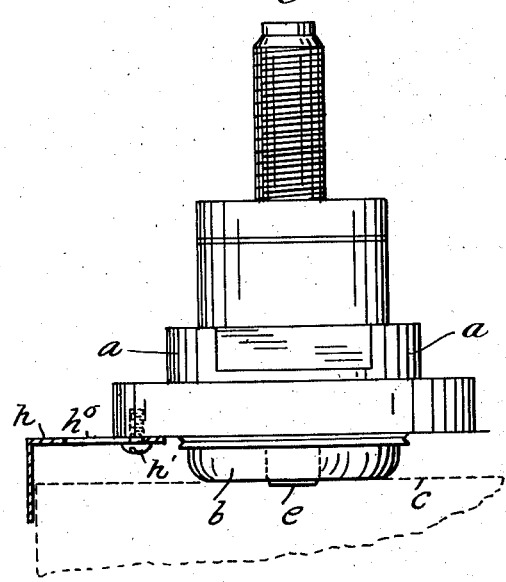
Fig. 1 is an elevation of the device with a guiding device shown in section.
Figure 2:
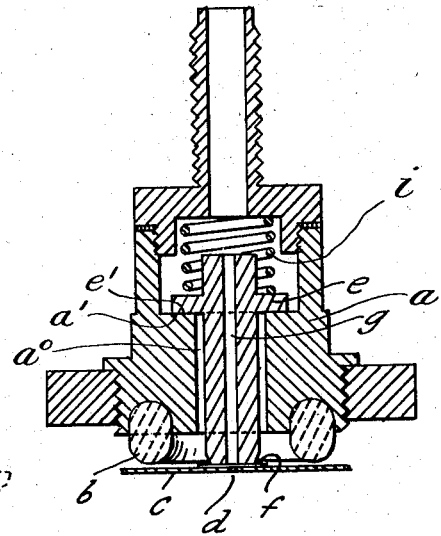
Fig. 2 is a longitudinal section through the device.

The nozzle may have attached to it a guiding device indicated at $h$ (Fig. 1) for centralizing the tin or other container to be evacuated so as to ensure the registration of the punger $e$ with the pinhole $d$, and this guide may be adjustably secured, as by means of set screw $h'$ passing through slot $h°$ in the guide and screwed into the nozzle flange to suit different sizes and shapes of tins or may be interchangeable with others adapted for tins of different shapes and sizes.

Having thus described the nature of the said invention and the best means I know of carrying the same into practical effect, I claim:—

1. Means for sealing the evacuation pinholes in tins or other metallic or partly metallic containers, comprising in combination a suction nozzle having means for connection with an evacuating device, a luting ring on the face of said nozzle, a movable plunger within the said suction nozzle having a longitudinal bore therethrough communicating with the nozzle, and adapted to hold a loose disk of thin material interposed between the bore hole of the said plunger and the evacuation pinhole of the container, and a spring operating to compress the plunger and with it the disk of thin material against the container to close the evacuation aperture therein.

2. Means for sealing the evacuation pinholes in tins or other metallic or partly metallic containers comprising a hollow nozzle having means for connection with an evacuating device, a duct leading from the interior to the exterior of the said nozzle, a luting ring upon the exterior of the said nozzle and encircling the said duct, a plunger guided for axial movement in the said nozzle, means carried by the plunger adapted to cover the inner end of the duct leading from the exterior to the interior of the said nozzle and a duct in said plunger leading from the outer end of same to the interior of the said nozzle.

3. Means for sealing the evacuation pinholes in tins or other metallic or partly metallic containers comprising a hollow nozzle having means for connection with an evacuating device, a duct leading from the interior to the exterior of the said nozzle, a luting ring upon the exterior of the said nozzle, and encircling the said duct, a plunger guided for axial movement in the said nozzle, a flange upon said plunger adapted to cover the inner end of the duct leading from the exterior to the interior of the nozzle, and a spring abutting upon the said flange and upon the rear end of the interior of the said nozzle.

In testimony whereof I have signed my name to this specification.

HENRY JEFFREY POOLE.